J. O. WICK.
COFFEE POT STRAINER.
APPLICATION FILED APR. 1, 1914.
1,130,557.
Patented Mar. 2, 1915.
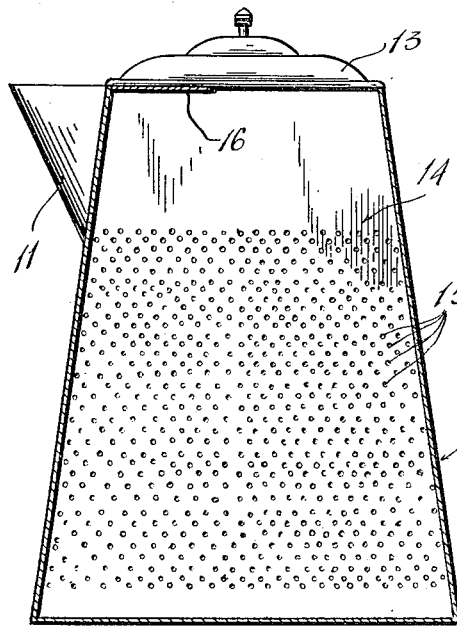
FIG. 1.
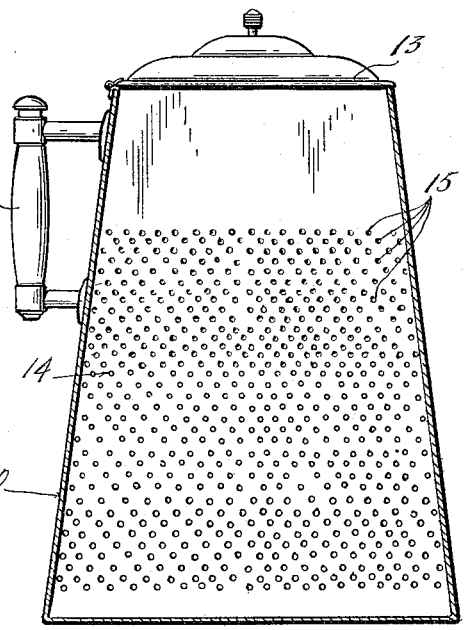
FIG. 2.
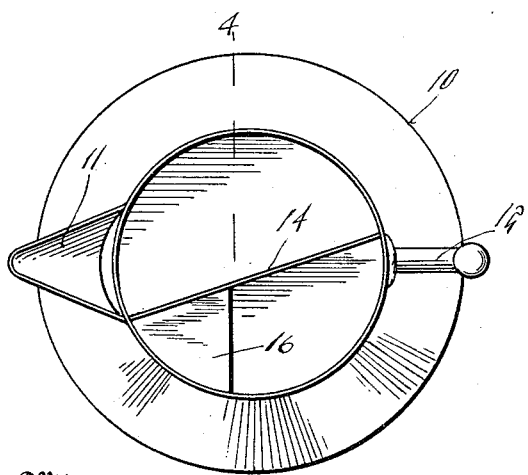
FIG. 3.
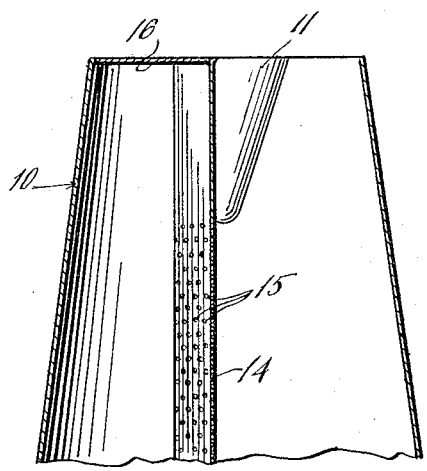
FIG. 4.
Inventor
J. O. Wick.
By Chandler & Chandler
Attorneys
Witnesses

UNITED STATES PATENT OFFICE.

JACOB O. WICK, OF CLIFFORD, NORTH DAKOTA.

COFFEE-POT STRAINER.

1,130,557.  Specification of Letters Patent.  Patented Mar. 2, 1915.

Application filed April 1, 1914. Serial No. 828,804.

*To all whom it may concern:*

Be it known that I, JACOB O. WICK, a citizen of the United States, residing at Clifford, in the county of Traill, State of North Dakota, have invented certain new and useful Improvements in Coffee-Pot Strainers; and I do hereby declare the following to be a full, clear, and exact description of the invention, such as will enable others skilled in the art to which it appertains to make and use the same.

This invention relates to coffee pots and has special reference to a coffee pot provided with an integral strainer.

In coffee pots which have strainers dividing the pot into two compartments, the strainer being arranged vertically, it has been customary to dispose the strainer at right angles to the line passing between the handle of the pot and the spout of the pot. Under these circumstances when the pot was tilted for pouring the flow of coffee from the compartment remote from the spout was substantially at right angles to the plane of the strainer so that the grounds were washed up against the strainer and spread out all over it thus choking said strainer.

The principal object of the present invention is to provide a strainer so arranged in the coffee pot that the tendency of the outflowing coffee will be to keep the strainer clean.

With the above and other objects in view the invention consists in general of certain novel details of construction and combination of parts hereinafter fully described, illustrated in the accompanying drawings, and specifically claimed.

In the accompanying drawings, like characters of reference indicate like parts in the several views, and Figure 1 is a vertical section through a coffee pot provided with a strainer constructed in accordance with this invention. Fig. 2 is a similar view taken from the other side of the strainer. Fig. 3 is a plan view of the pot with the lid omitted. Fig. 4 is a section on the line 4—4 of Fig. 3.

In carrying out the objects of this invention there is provided a pot 10 of the usual construction and this pot has the pouring spout 11 and handle 12 arranged diametrically opposite each other. Furthermore the pot is provided with the usual cover or lid 13.

The strainer proper consists of a sheet of metal extending diametrically across the pot from a point closely adjacent to one side of the spout 11 to a point adjacent to the opposite side of the handle 12 so that the strainer extends diagonally between the spout and handle portions of the pot. This strainer consists of a sheet of metal provided with a series of perforations 15 arranged in horizontal rows and the perforations in one row are staggered with relation to the perforations in the other rows. The strainer is preferably made of aluminum for the purpose of cleanliness. The perforations 15 terminate just short of the bottom of the spout 11 so that the upper part of the strainer forms an imperforate partition. In order to prevent any of the grounds from washing over the edge of the strainer, the latter reaching from the top to the bottom of the pot, there is provided at the forward edge of the top of the pot a baffle plate 16 which thus covers the forward portion of the compartment in the pot which is adapted to contain the ground coffee.

In use, the ground coffee is placed in the compartment of the pot remote from the spout 11 and is treated with boiling water in the usual manner. Then when the coffee is poured out of the pot the flow of liquid in the coffee containing compartment will wash along the side of the strainer so that the grounds are washed off therefrom and are thus prevented from clogging the perforations 15.

It is to be understood that the strainer is a permanent fixture, being securely soldered or otherwise attached to the inside thereof.

There has thus been provided a simple and efficient device of the class described and of the character specified.

Having thus described the invention, what is claimed as new, is:—

1. The combination with a coffee pot provided with diametrically opposed handle and spout carrying portions, of a vertically disposed strainer fixed within said pot and extending diagonally between the handle and spout portions thereof.

2. The combination with a coffee pot provided with diametrically opposed handle and spout carrying portions, of a vertically disposed strainer fixed within said pot and extending diagonally between the handle and spout portions thereof, said strainer comprising a sheet of material extending from top to bottom of the pot, said sheet being perforated from a point below the spout portion of the pot to the bottom thereof and being imperforate thereabove.

3. The combination with a coffee pot provided with diametrically opposed handle and spout carrying portions, of a vertically disposed strainer fixed within said pot and extending diagonally between the handle and spout portions thereof, said strainer comprising a sheet of material extending from top to bottom of the pot, said sheet being perforated from a point below the spout portion of the pot to the bottom thereof and being imperforate thereabove, and a lateral plate arranged at the top of the pot and extending between the strainer and the top edge of the pot at the forward portion thereof, said plate being located on the side of the strainer opposite the spout portion of the pot.

In testimony whereof, I affix my signature, in the presence of two witnesses.

JACOB O. WICK.

Witnesses:
H. N. KLEV,
H. A. KNUDSON.

Copies of this patent may be obtained for five cents each, by addressing the "Commissioner of Patents, Washington, D. C."